(12) United States Patent
Noh

(10) Patent No.: US 10,976,570 B2
(45) Date of Patent: Apr. 13, 2021

(54) PAPER GLASSES AND METHOD FOR MANUFACTURING THE SAME

(71) Applicant: Jae Yong Noh, Seoul (KR)

(72) Inventor: Jae Yong Noh, Seoul (KR)

( * ) Notice: Subject to any disclaimer, the term of this patent is extended or adjusted under 35 U.S.C. 154(b) by 203 days.

(21) Appl. No.: 16/304,680

(22) PCT Filed: Mar. 15, 2018

(86) PCT No.: PCT/KR2018/003016
§ 371 (c)(1),
(2) Date: Nov. 26, 2018

(87) PCT Pub. No.: WO2019/050113
PCT Pub. Date: Mar. 14, 2019

(65) Prior Publication Data
US 2019/0235273 A1    Aug. 1, 2019

(30) Foreign Application Priority Data

Sep. 11, 2017 (KR) .......................... 10-2017-0115719

(51) Int. Cl.
| | |
|---|---|
| *G02C 1/00* | (2006.01) |
| *G02C 5/22* | (2006.01) |
| *G02C 5/12* | (2006.01) |
| *G02C 5/18* | (2006.01) |
| *F16B 4/00* | (2006.01) |
| *B31D 5/04* | (2017.01) |
| *F16B 11/00* | (2006.01) |
| *G02C 13/00* | (2006.01) |
| *G02C 5/00* | (2006.01) |
| *G02C 5/14* | (2006.01) |

(52) U.S. Cl.
CPC ............... *G02C 5/22* (2013.01); *B31D 5/04* (2013.01); *F16B 4/00* (2013.01); *F16B 4/008* (2013.01); *F16B 11/00* (2013.01); *F16B 11/006* (2013.01); *G02C 5/008* (2013.01); *G02C 5/12* (2013.01); *G02C 5/18* (2013.01); *G02C 13/001* (2013.01); *G02C 5/146* (2013.01)

(58) Field of Classification Search
CPC ................................ G02C 11/02; G02C 7/021
USPC ............................... 351/41, 47, 57, 111, 116
See application file for complete search history.

(56) References Cited

U.S. PATENT DOCUMENTS 6,641,260 B1 * 11/2003 Avital .................... G02C 5/006
351/115

FOREIGN PATENT DOCUMENTS

KR          1647597      *    8/2016

* cited by examiner

*Primary Examiner* — Hung X Dang
(74) *Attorney, Agent, or Firm* — Revolution IP, PLLC

(57) ABSTRACT

The present invention provides paper glasses and a method for manufacturing the same including a lens frame connected in parallel to both sides of a central bridge to fix a lens; glasses temples which are extended integrally from both sides of the lens frame and bent at an angle perpendicular to the lens frame to wear the lens frame on the face; and a support piece of which one end is fixed to the lens frame and the other end is fixed to the front end of the glasses temples to ensure a support force of the glasses temples and maintain a predetermined angle of the glasses temples.

19 Claims, 10 Drawing Sheets

[FIG. 1]
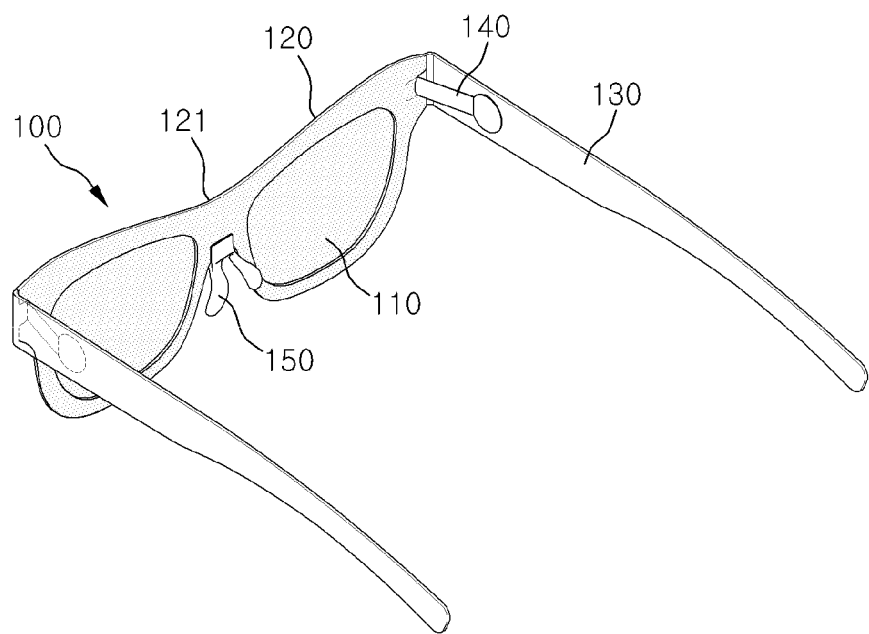
[FIG. 2]
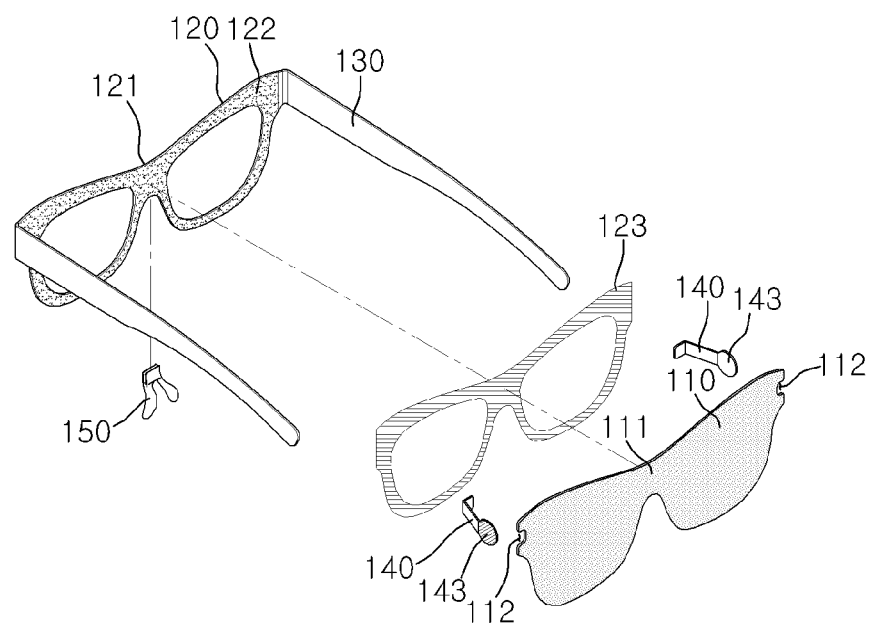

[FIG. 3]
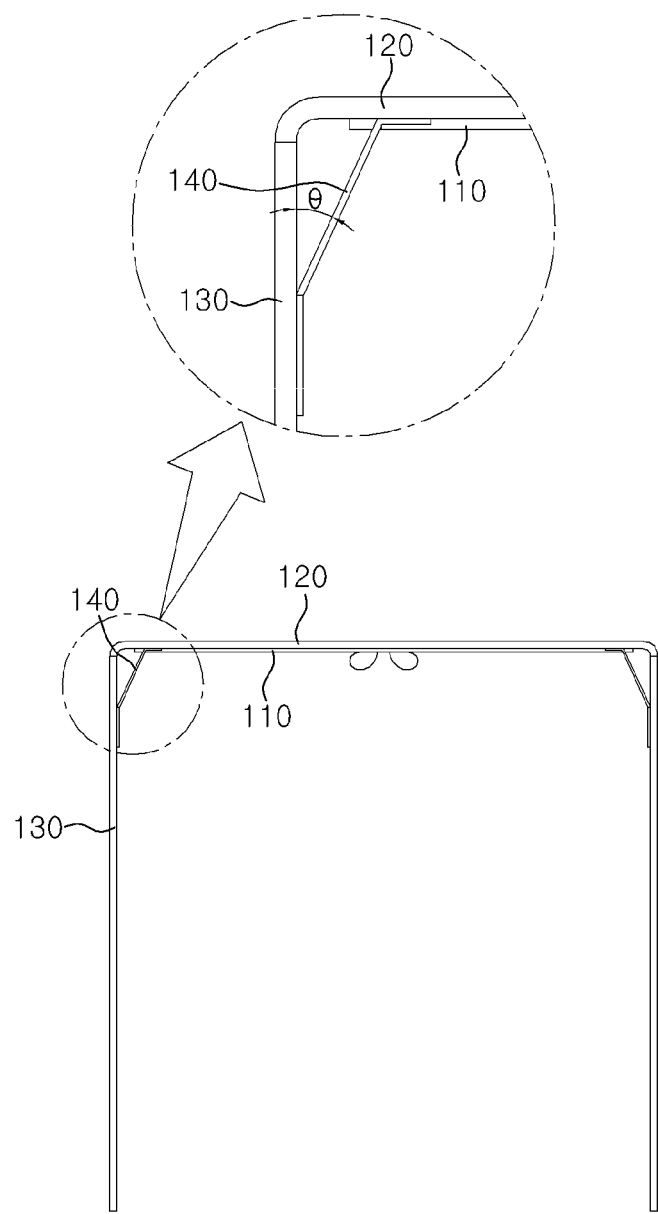

[FIG. 4]
(a)
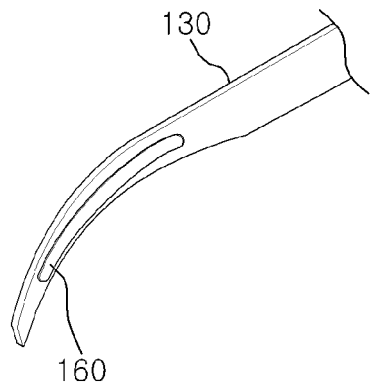
(b)
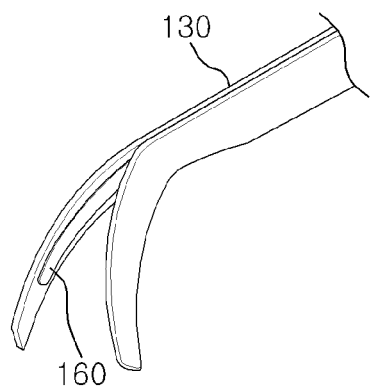
[FIG. 5]
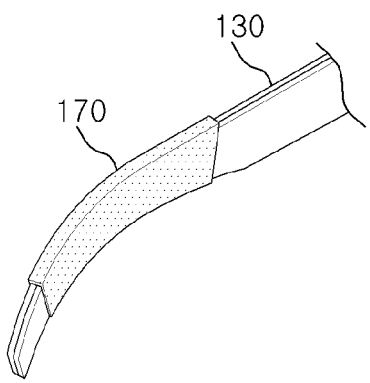

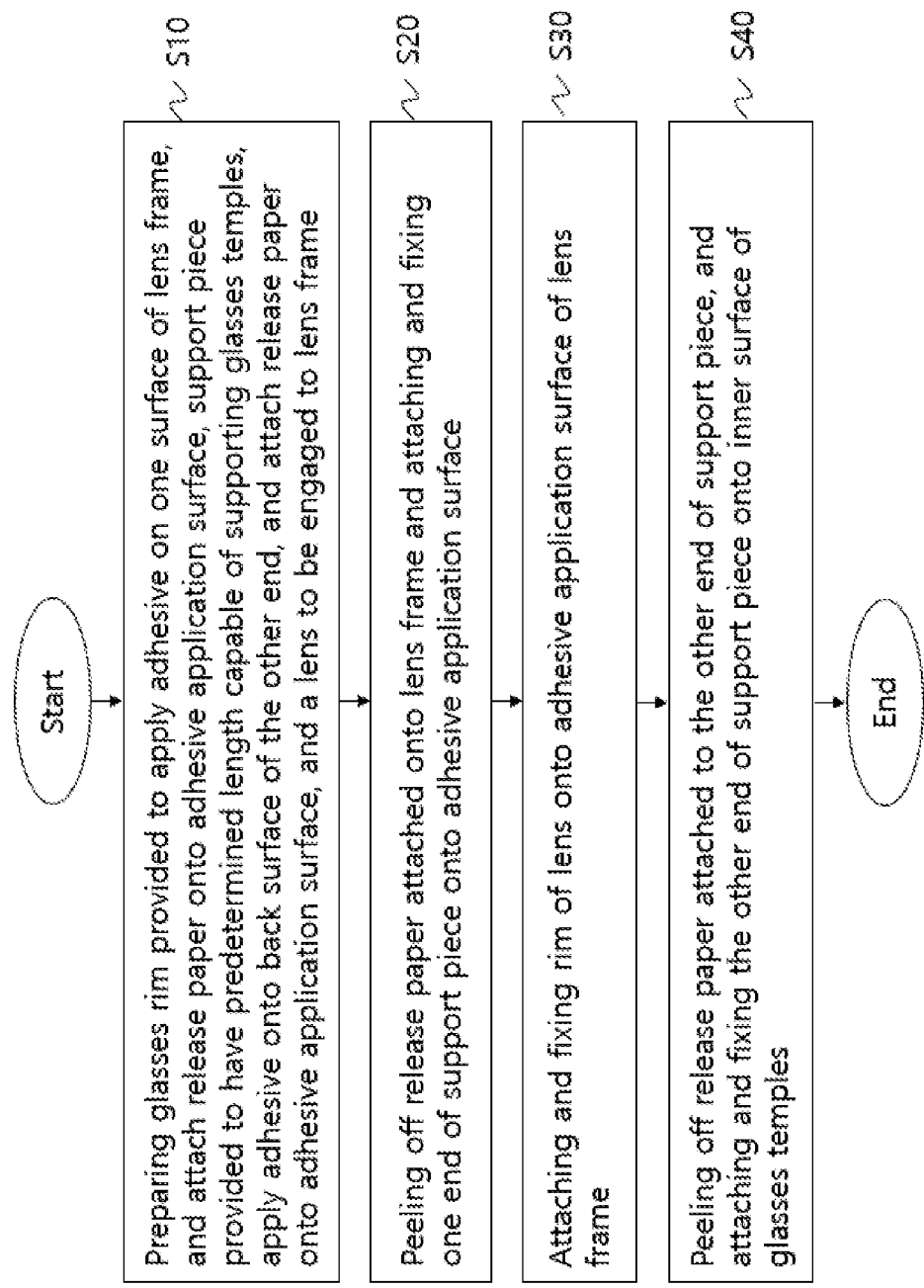

[FIG. 7]
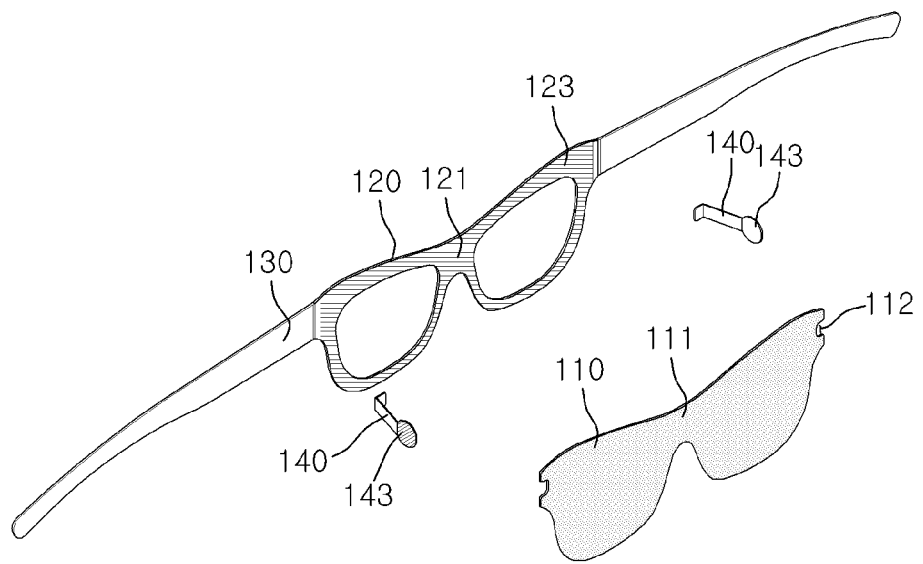

[FIG. 8]
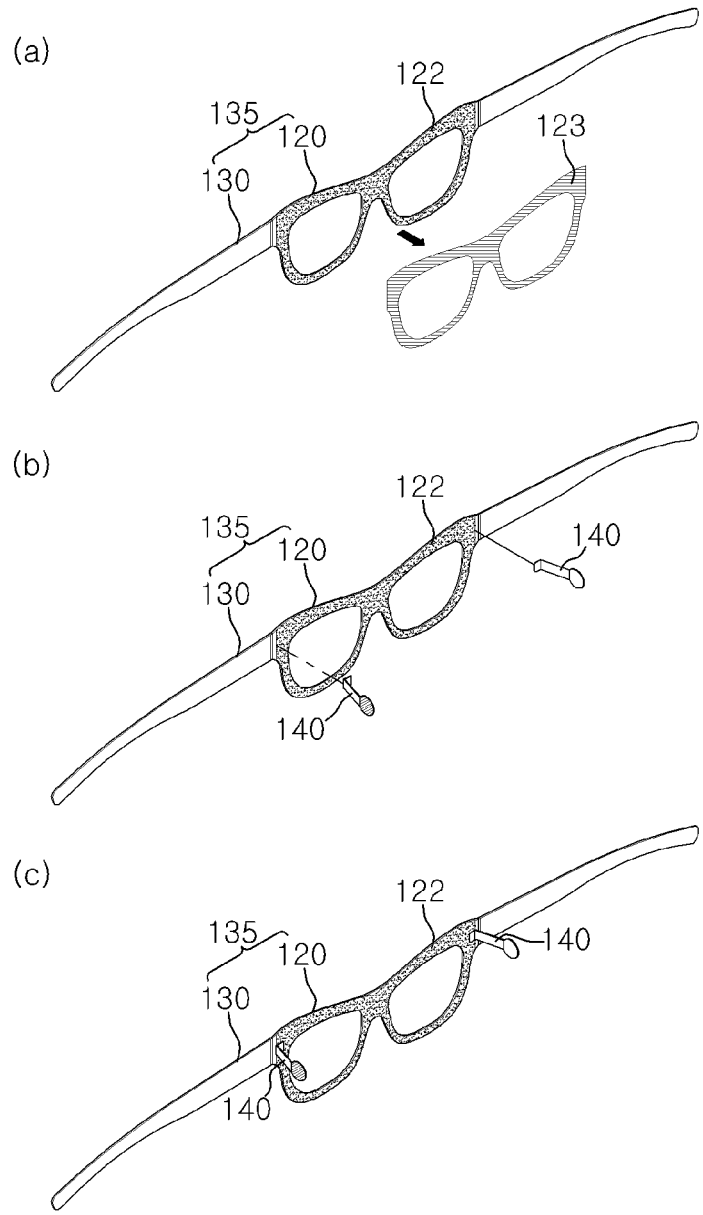

[FIG. 9]
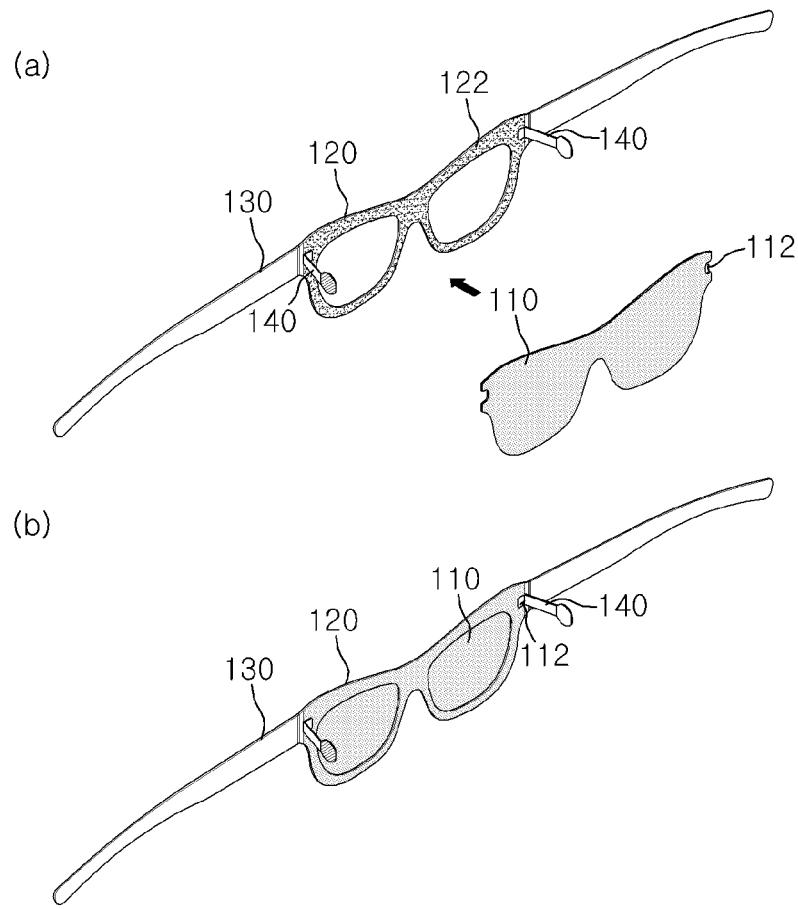

[FIG. 10]
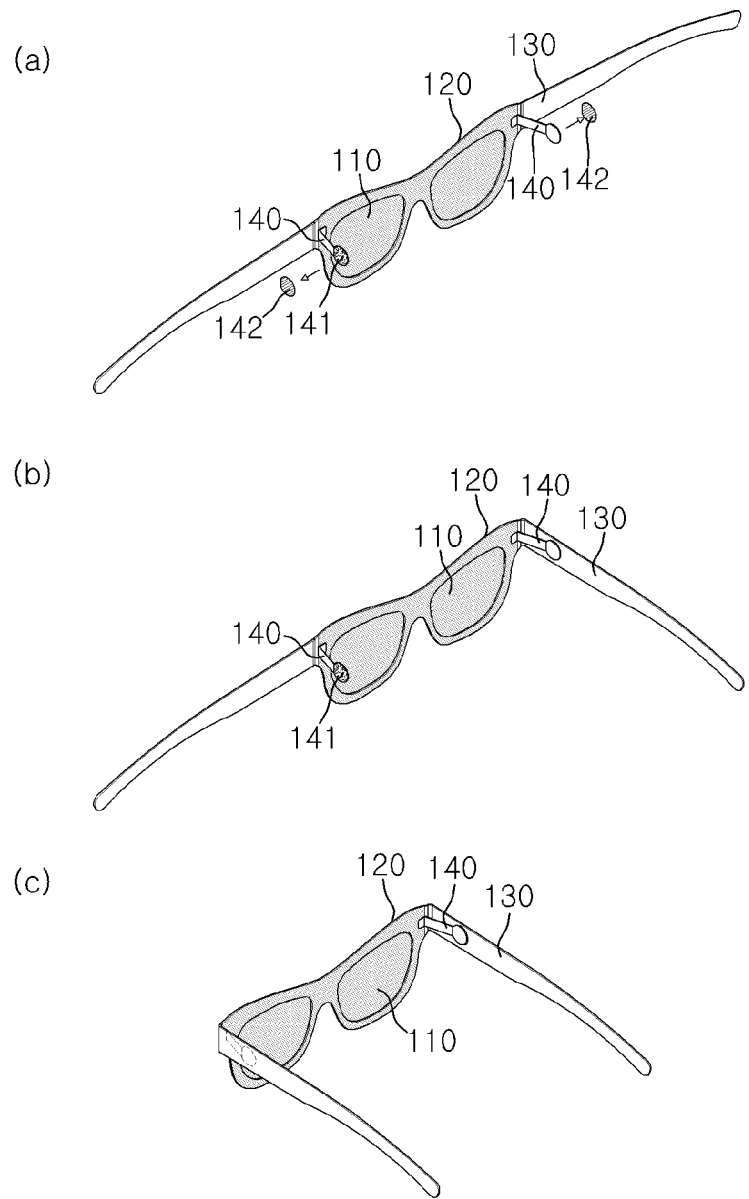

[FIG. 11]
(a)
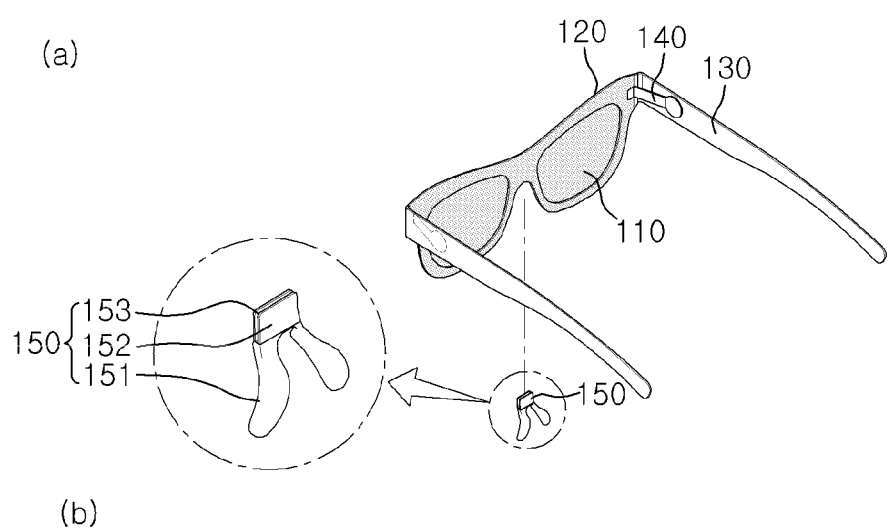
(b)
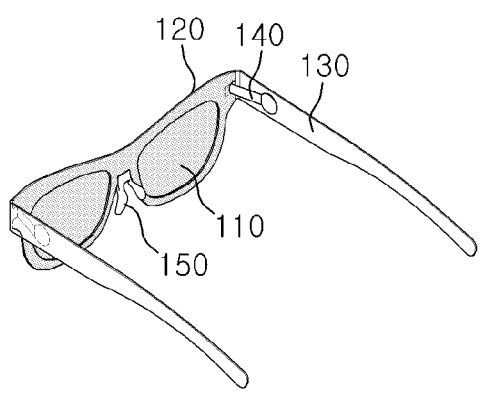

[FIG. 12]
(a)
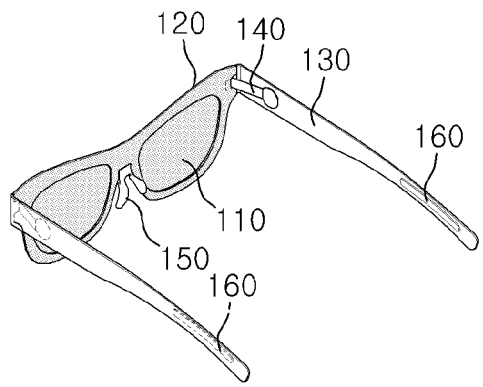
(b)
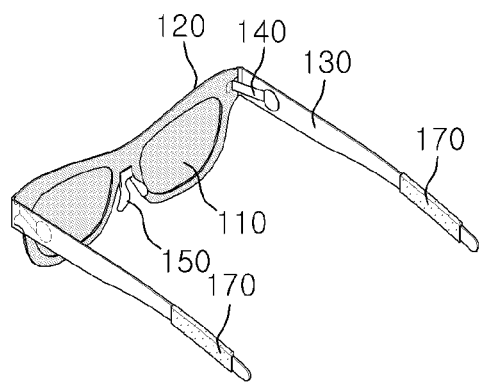

PAPER GLASSES AND METHOD FOR MANUFACTURING THE SAME

TECHNICAL FIELD

The present invention relates to paper glasses and a method for manufacturing the same and more particularly, to paper glasses and a method for manufacturing the same which allows glasses temples to be maintained in a predetermined angle range to maintain a shape of glasses and increase feeling of wearing of glasses.

BACKGROUND ART

Generally, glasses have been developed as a tool for overcoming the visual impairment caused by ametropia, but recently, have been used for various purposes such as being worn for fashion. In particular, the use of glasses for temporary use until the eyes are stabilized after eye related procedures and operations such as LASIK and LASEK and stereoscopic image appreciation has been increased.

The glasses of the temporary use are often provided temporarily from the related company to the user for a required period, so that the company for providing the glasses wants to be able to manufacture the glasses at low cost. Also, even if the glasses are manufactured as an uncomfortable or rugged design during wearing, the glasses are temporarily used, so the user uses the glasses by considering it.

However, the glasses manufactured inexpensively as the temporary use are significantly deteriorated in the feeling of wearing even with slight repetitive wearing, and nevertheless, when the glasses are continuously used, it tends to be harder to wear the glasses by holding the glasses with a hand or requiring additional fixing the glasses with an adhesive or the like.

Even if the user takes the inconvenience and uses inexpensively the glasses for temporary use, it is difficult to take the difficulty of wearing itself. Therefore, there is a demand for a product which is inexpensive in terms of price but has a certain degree or more of strength and does not cause problems in the shape maintenance and wearing of the glasses for a temporary period in which the use of the glasses is required.

In recent years, the use of paper glasses with various colors, freely special expressions, and low costs has been enhanced in various events such as national and international fashion shows, beaches, clubs, baseball courts, golf courses, soccer fields, and festivals, starting with fashionistas who are pursuing new trends.

However, the paper glasses sold on the market generally have a weak fixing force of the temples of the glasses and a support force of the temples of the glasses due to a characteristic of a paper material because the glasses frame and the glasses temples are simply bent in a "¬" shape. As a result, there is a problem in that when the wind is blown or the movement is large during wearing the paper glasses, the paper glasses are easily removed from the face.

As such, currently, the paper glasses have many difficulties to be worn compared to high utilization and thus tend to be not practical use, and structural improvement is urgently required to faithfully perform functions as glasses.

DISCLOSURE

Technical Problem

The present invention has been made to solve the conventional problems.

An object of the present invention is to provide paper glasses and a method for manufacturing the same in which a support piece supporting glasses temples is provided at a lens frame engaged with a lens and a bending portion of the glasses temples to stably support the glasses temples and reinforce the support force of the glasses temples, and the glasses temples is maintained in a predetermined angle range to maintain the shape of the glasses and increase the feeling of wearing of the glasses.

Technical Solution

According to an aspect of the present invention provided to achieve the object, there is provided paper glasses including: a lens frame connected in parallel to both sides of a central bridge to fix a lens; glasses temples which are extended integrally from both sides of the lens frame and bent at an angle perpendicular to the lens frame to wear the lens frame on the face; and a support piece of which one end is fixed to the lens frame and the other end is fixed to the front end of the glasses temples to ensure a support force of the glasses temples and maintain a predetermined angle of the glasses temples.

Concave grooves may be formed at both sides of the lens so that one end of the support piece is inserted into a position corresponding to one end of the support piece and the support piece may be inserted into the concave groove to ensure a support angle capable of stably supporting the glasses temples.

The support angle of the support piece may be adjusted according to a depth of the support piece inserted into the concave groove.

One surface of the lens frame may be applied with an adhesive and the lens is attached onto the adhesive application surface.

One end of the support piece may be interposed and fixed between the adhesive application surface of the lens frame and the lens attached to the adhesive application surface and the other end thereof may be attached to a front end of the glasses temples with an adhesive applied to the back surface.

The other end or both ends of the support piece may include an adhesive portion having a larger area than the support piece so that a large area is in surface contact to increase an adhesive force.

In addition, a bridge of the lens frame may be fitted with a nose support which increases a slip prevention function and the feeling of wearing of the glasses, and the nose support may include a nose support pad made of a soft resin or a silicon material which is seated on the bridge of the nose of the wearer and an engaging groove having an engaging groove correspondingly to the bridge so as to fit the nose support pad to the bridge.

The engaging portion may be formed of a synthetic resin material having predetermined elasticity to be tightly fitted to the bridge or has a tension piece restricting the bridge in the engaging groove with tensioning.

In addition, a reinforcing piece which is installed at one longitudinal side of the glasses temples to variously change and maintain a bending angle of the installation area may be provided in the glasses temples.

The reinforcing piece may be installed in a form to be attached to one surface of the glasses temples or installed in a form to be embedded in the inside of the glasses temples.

A reinforcing member covering and protecting the reinforcing piece may be provided in the glasses temples.

The reinforcing member may be formed of a material to be shrunk upon heating and fixed to the glasses temples through shrinkage by thermal processing in the form of covering the reinforcing piece of the glasses temples.

According to another aspect of the present invention, there is provided a method for manufacturing paper glasses including: preparing a glasses rim provided to integrally connect the lens frame and the glasses temples, apply the adhesive on one surface of the lens frame, and attach the release paper onto the adhesive application surface, a support piece provided to have a predetermined length capable of supporting the glasses temples, apply the adhesive onto the back surface of the other end, and attach a release paper onto the adhesive application surface, and a lens to be engaged to the lens frame (step S10); peeling off the release paper attached onto the lens frame and attaching and fixing one end of the support piece onto the adhesive application surface on a central line of the glasses temples (step S20); attaching and fixing a rim of the lens onto the adhesive application surface of the lens frame so that one end of the support piece is embedded (step S30); and peeling off the release paper attached to the other end of the support piece, folding the glasses temples at an angle perpendicular to the lens frame to form a shape of the glasses, and then attaching and fixing the other end of the support piece applied with an adhesive onto the inner surface of the glasses temples (step S40).

In addition, in step S10, concave grooves into which one end of the support piece is inserted may be formed at both sides of the lens, and the support piece may include an adhesive portion having a larger area than the support piece so as to increase the adhesive force because an area being in surface contact with the other end or both ends is increased.

In step S30, the lens may be attached onto the adhesive application surface of the lens frame to embed one end of the support piece and the support piece is inserted and attached between the concave grooves.

In step S40, one side of the support piece inserted into the concave groove of the lens and the other side of the support piece attached to the glasses temples may be inclined diagonally to secure a support angle for stably supporting the glasses temples.

In addition, the method may further include preparing a nose support to be fitted to the bridge of the lens frame in step S10, and fitting the engaging portion of the nose support to the bridge of the lens frame after step S40, and the engaging portion of the nose support may be formed of a synthetic resin material having predetermined elasticity to be tightly fitted to the bridge or have a tension piece restricting the bridge in the engaging groove with tensioning.

In addition, the method may further include preparing a reinforcing piece which is installed at one side of the glasses temples to variously change and maintain a bending angle of the installation area and a reinforcing member covering and protecting the reinforcing piece in step S10, and attaching the reinforcing piece to one longitudinal side area of the glasses temples, covering the reinforcing piece and the outside of the glasses temples with the reinforcing member, and fixing the reinforcing piece to the glasses temples by shrinkage of the reinforcing member by thermal processing, after step S40.

Advantageous Effects

According to the embodiments of the present invention, it is possible to reinforce a support force of the glasses temples by providing the support piece which stably supports the glasses temples at the lens frame and the bent portion of the glasses temples.

Also, it is possible to increase the support force of the glasses temples by ensuring the support angle of the support piece through the concave groove of the lens and prevent the glasses from being easily peeled even in motion or wind by increasing the feeling of wearing of the glasses.

Further, the support piece holds the glasses temples to be maintained in a predetermined angle range to prevent the bending portion of the glasses temples from being easily modified or being broken even if the glasses are worn or removed, thereby constantly maintaining the shape of the glasses.

Further, the nose support made of silicon or a soft resin is used to give the very good feeling of wearing when the glasses are worn on the face, hold the center of the glasses, and provide comfort of the wearing of the glasses by a function of preventing the glasses from flowing down.

Further, various bending angles of the glasses temples may be adjusted by reinforcing one longitudinal side of the glasses temples by the reinforcing member and the reinforcing piece, thereby maintaining the shape of the glasses and greatly increasing the feeling of wearing of the glasses.

DESCRIPTION OF DRAWINGS

FIG. 1 is a perspective view illustrating paper glasses according to an embodiment of the present invention.

FIG. 2 is an exploded perspective view exploding and illustrating the paper glasses according to the embodiment of the present invention.

FIG. 3 is a plan view illustrating a support angle of a support piece in the paper glasses according to the embodiment of the present invention.

FIG. 4 is a main enlarged view illustrating a reinforcing piece for variously changing and maintaining a bending angle of glasses temples in the paper glasses according to the embodiment of the present invention.

FIG. 5 is a main enlarged view illustrating a reinforcing member for covering and protecting the reinforcing piece provided on the glasses temples in FIG. 4.

FIG. 6 is a flowchart illustrating a method for manufacturing paper glasses according to an embodiment of the present invention.

FIG. 7 is a perspective view illustrating a state in which a glasses frame, a support piece, and a lens are prepared in the method for manufacturing the paper glasses according to the embodiment of the present invention.

FIG. 8 is a perspective view illustrating a state in which a releasing film of a lens frame is peeled off from the glasses frame prepared in FIG. 7 to expose an adhesive application surface and one end of the support piece is attached to the exposed adhesive application surface.

FIG. 9 is a perspective view illustrating a state in which the lens is attached to the adhesive application surface of the lens frame in the state of FIG. 8.

FIG. 10 is a perspective view showing a state in which the glasses temples are folded to be perpendicular to the lens frame in the state of FIG. 9 and the other end of the support is attached and fixed to the glasses temples.

FIG. 11 is a perspective view illustrating a state in which a nose support is fitted to a bridge of the lens frame in the state of FIG. 10.

FIG. 12 is a perspective view illustrating a state in which a reinforcing piece is attached to the glasses temples in the state of FIG. 11 and the outside of the reinforcing piece is covered with the reinforcing member.

MODES OF THE INVENTION

The following detailed descriptions of the present invention are embodiments in which the present invention is implemented and will be described with reference to accompanying drawings illustrated as examples of the embodiments. These embodiments will be sufficiently described in detail enough to carry out the present invention by those skilled in the art. It should be understood that various embodiments of the present invention are different from each other, but need not to be mutually exclusive. For example, a specific figure, a structure, and a characteristic described herein may be implemented as another embodiment without departing from a spirit and a scope of the present invention in relation to an embodiment. Further, it should be understood that a position or a displacement of an individual constituent element in each disclosed embodiment may be changed without departing from the spirit and the scope of the present invention.

Accordingly, a detailed description below is not taken as a limited meaning, and is defined by the accompanying claims together with all equivalent scopes to the claims if the scope of the present invention is appropriately described. Like reference numerals in the drawing denote the same or similar function throughout several aspects.

Terms used in the present invention adopt general terms which are currently widely used as possible by considering functions in the present invention, but the terms may be changed depending on an intention of those skilled in the art, a precedent, emergence of new technology, etc. Further, in a specific case, a term which an applicant arbitrarily selects is present and in this case, a meaning of the term will be disclosed in detail in a corresponding description part of the invention. Accordingly, a term used in the present invention should be defined based on not just a name of the term but a meaning of the term and contents throughout the present invention.

Further, throughout the specification, unless explicitly described to the contrary, the word "comprise" and variations such as "comprises" or "comprising", will be understood to imply the inclusion of stated elements but not the exclusion of any other elements. In addition, terms including "part', "module", and the like disclosed in the specification mean a unit that processes at least one function or operation and this may be implemented by hardware or software or a combination of hardware and software.

Paper glasses and a method for manufacturing the same according to embodiment of the present invention will be described with reference to FIGS. 1 to 12.

First, paper glasses 100 according to an embodiment of the present invention will be described with reference to FIGS. 1 to 3.

As illustrated In FIGS. 1 to 3, the paper glasses 100 according to the embodiment of the present invention includes a lens frame 120 to which a lens 110 is engaged, glasses temples 130 which are extended integrally from both sides of the lens frame 120 and bent at an angle perpendicular to the lens frame 120 to wear the lens frame 120 on the face; and a support piece 140 of which one end is fixed to the lens frame 120 and the other end is fixed to the front end of the glasses temples 130 to ensure a support force of the glasses temples 130 and maintain a predetermined angle of the glasses temples 130.

A pair of lens frames is connected and arranged side by side by a bridge 121 so that the lens frame 120 faces wearer's eyes.

The glasses temples 30 are integrally extended from both sides of the lens frame 120 and bent at an angle perpendicular to the lens frame 120 so that the lens frame 120 may be hung on a wearer's ear to be worn on the wearer's face.

In addition, the lens frame 120 and the glasses temples 130 are fabricated to have an appropriate thickness or have appropriate strength and durability in order to reduce the occurrence of problems to be difficult to wear the glasses such as deformation and malfunction while a coating layer is formed on an outer surface and used temporarily.

A material, a thickness, and the like of the paper are selected according to the size and thickness of the lens 110 and the shape of the lens frame 120 may be freely designed and fabricated according to the shape of the lens 110, so that the lens frame 120 is not greatly influenced by a type, a weight, a thickness, etc. of the lens 110.

When one surface of the lens frame 120, that is, one surface facing the face of the lens frame 120 is defined as an inner surface, an adhesive is applied to the inner surface of the lens frame 120.

In addition, a rim of the lens 110 is attached and fixed to the adhesive application surface 122 of the lens frame 120.

A pair of lenses 110 may be provided in a separated form to be fixed to the lens frame 120, respectively, but as illustrated in the drawings, the pair of lenses is connected to the bridge 111 to have the same shape of the lens frame 120.

The lens 110 preferably uses a UV film having an ultraviolet shielding function, but the present invention is not limited thereto. In addition to general eyeglasses, the lens 110 includes eyeglasses having a sunglass function, goggles in a form in which an ultraviolet ray shielding film is attached to the lens 110 to combine the sunglass function or used for the purpose of welding or the like, and all eyeglasses types having a film form other than a lens form, which are installed on the lens frame 120 to be used for temporary use.

In addition, concave grooves 112 into which one end of the support piece may be inserted are formed on both sides of the lens 110.

The concave grooves 112 are provided so as to be positioned on the same line as the center line of the glasses temples 130 and function to ensure the support angle so that the support piece 140 may stably support the glasses temples 130.

The support piece 140 may have a predetermined length so as to ensure a support angle θ that can support the glasses temples 130 when one end is fixed to the lens frame 120 and the other end is fixed to the glasses temples 130, an adhesive is applied to the back surface of the other end, and a release paper 142 is attached to the adhesive application surface 141. At this time, the other end of the support piece 140 may include an adhesive portion 143 having a larger area than the support piece 140 so as to increase the adhesive force because an area being in surface contact with the glasses temples 130 is increased, and onto the back surface of the adhesive portion 143, the adhesive is applied and the release paper 142 is attached.

Although not illustrated in the drawing, the adhesive portion 143 may be provided even at one end of the support piece 140 if necessary. In the adhesive portion provided at one end of the support piece, it is necessary to apply the adhesive or attach the release paper onto the back surface, but it is possible to increase the engaging force by widening the surface contact area with the lens frame.

The support piece 140 is interposed between the lens frame 120 and the lens 110 in a state where one end of the support piece 140 is inserted into the concave groove 112 of the lens and the other end is attached onto the inner surface of the front end of the glasses temples 130.

In this case, one end of the support piece 140 may also be fixed by inserting the support piece 140 between the lens frame 120 and the lens 110 before the lens 110 is attached to the lens frame 120, but one end of the support piece 140 is first attached and fixed to the adhesive surface of the lens frame 120 and then the lens 110 may be attached thereon.

In addition, the release paper 142 of the adhesion portion 143 is peeled off from the other end of the support piece 140 to expose the adhesive 140 and then the adhesive portion 143 is attached and fixed onto a central line of the inner surface of the glasses temples 130.

As such, one end of the support piece 140 is inserted into the concave groove 112 of the lens 110 and the other end thereof is attached onto the inner surface of the glasses temples 130 to ensure the support angle θ capable of supporting the glasses temples 130.

Also, the support piece 140 may adjust the support angle θ of the glasses temples 130 by adjusting the depth to be inserted into the concave groove 112.

The support piece 140 connects the lens frame 120 and the glasses temples 130 and functions to hold the glasses temples 130 so as not to depart from a predetermined angular range of an angle perpendicular to the lens frame 120.

Therefore, the support piece 140 secured with the support angle θ stably supports the glasses temples 130 to reinforce the support force of the glasses temples 130, and allows the glasses temples 130 to be maintained in a predetermined angle range, thereby maintaining the shape of the glasses and increasing the wearing force of the glasses.

In addition, the bridge 121 of the lens frame 120 may be fitted with the nose support 150, which enhances a slip prevention function and the feeling of wearing of the glasses.

The nose support 150 may include a nose support pad 151 made of a soft resin or a silicone material that is seated on the bridge of the nose of the wearer and an engaging portion 152 having an engaging groove 153 correspondingly to the bridge 121 so as to fit the nose support pad 151 to the bridge 121.

In addition, the engaging portion 152 is formed of a synthetic resin material having predetermined elasticity to be tightly fitted to the bridge 121 or has a tension piece (not illustrated) restricting the bridge 121 in the engaging groove 152 with tensioning to be closely engaged to the bridge 121.

Accordingly, the nose support 150 may not be easily removed even in motion, increase the feeling of wearing when the glasses are worn on the face, prevent the glasses from flowing down, and provide comfort of the wearing the glasses.

In addition, at one longitudinal side of the glasses temples 130, a reinforcing piece for variously changing and maintaining a bending angle of the glasses temples may be provided.

The glasses temples 130 have a certain level of elasticity according to the material of the paper, and are basically unfolded, that is, formed to extend in a straight line. In addition, a reinforcing piece for assisting the paper may be provided due to the characteristic of the paper, which is difficult to restore to its original state when the paper is folded with a stronger force than the elasticity of the paper. In other words, since a portion of the glasses temples 130 that contacts the wearer is formed in a straight line, it may be difficult to wear the paper glasses on the wearer's face. Even if the glasses temples 130 are worn in a bent shape, the feeling of wearing may be deteriorated due to the elasticity of the paper, and thus a reinforcing piece 160 is installed as an apparatus for changing a bending angle of the glasses temples 130 and maintaining the glasses temples 130 at a changed angle.

The reinforcing piece 160 is attached onto one surface of the glasses temples as illustrated in FIG. 4A or embedded in the inside of the glasses temples as illustrated in FIG. 4B to change the bending angle of the glasses temples 130 to various angles and simultaneously maintain the bending angle at the changed angle. That is, the reinforcing pieces 160 are formed to have a higher plasticity than the elasticity of the paper constituting the glasses temples 130 to keep the bending state of the glasses temples 130 as it is.

The reinforcing piece 160 is fabricated to be easily bent by thinly smelting a metal such as aluminum or iron and maintain a changed shape because a restoring force is very small when the shape is changed due to little elasticity and strong plasticity.

In addition, as illustrated in FIG. 5, a reinforcing member 170 for covering and protecting the reinforcing piece 160 may be provided in the glasses temples. Since a corresponding portion of the glasses temples 130 provided with the reinforcing member 170 is a portion contacting the body of the wearer, the portion is preferably made of a soft material in order to enhance the feeling of wearing.

The reinforcing member 170 may be fixed through shrinkage by thermal processing after covering the reinforcing member and the outside of the glasses temples and may be formed of a shrinkable tube or the like which can be easily obtained.

Hereinafter, a method for manufacturing the paper glasses according to an embodiment of the present invention will be described with reference to FIGS. 6 to 11.

As illustrated in FIG. 6, the method for manufacturing the paper glasses according to the embodiment of the present invention includes preparing a glasses rim 135 provided to integrally connect the lens frame 120 and the glasses temples 130, apply the adhesive on one surface of the lens frame 120, and attach the release paper 123 onto the adhesive application surface 122, a support piece 140 provided to have a predetermined length capable of supporting the glasses temples 130, apply the adhesive onto the back surface of the other end, and attach a release paper 142 onto the adhesive application surface 141, and a lens to be engaged to the lens frame (step S10); peeling off the release paper 123 attached onto the lens frame 120 and attaching and fixing one end of the support piece 140 onto the adhesive application surface 122 on a central line of the glasses temples 130 (step S20); attaching and fixing a rim of the lens 110 onto the adhesive application surface 122 of the lens frame 120 so that one end of the support piece 140 is embedded (step S30); and peeling off the release paper 123 attached to the other end of the support piece 140, folding the glasses temples 130 at an angle perpendicular to the lens frame 120 to form a shape of the glasses, and then attaching and fixing the other end of the support piece 140 applied with an adhesive onto the inner surface of the glasses temples 130 (step S40).

In step S10, as illustrated in FIG. 7, the lens frame 120 and the glasses temples 130 are integrally connected to each other, and the glasses temples 130 are not folded, that is, formed to extend in a straight line. In addition, the adhesive is applied onto one surface of the lens frame 120 and the release paper 123 is attached onto the adhesive application surface 122.

The support piece 140 has a predetermined length for supporting the glasses temples 130, the adhesive is applied on the back surface of the other end, and the release paper 142 is attached onto the adhesive application surface 141. At this time, the other end of the support piece 140 may include an adhesive portion 143 having a larger area than the support piece 140 so as to increase the adhesive force because an area being in surface contact with the glasses temples 130 is increased, and the adhesive is applied on the back surface of the adhesive portion 143 and the releasing paper 142 is attached to the back surface of the adhesive portion 143.

A pair of lenses 110 is connected to each other by the bridge 121 so as to face the wearer's eyes to have the same shape as the lens frame 120, and concave grooves 112 to which one end of the support piece 140 is inserted are formed at both sides of the lens 110.

In step S20, as illustrated in FIG. 8A, the release paper 123 is peeled off from the lens frame 120 prepared in step S10 to expose the adhesive application surface 122 to the outside, and then as illustrated in FIG. 8B, one end of the support piece 140 is attached and fixed to the adhesive application surface 122 on a central line of the glasses temples 130 which is a connection area of the glasses temples 130. At this time, the attachment position of the support piece 140 needs to be selected in consideration of the position with respect to the concave groove 112 of the lens 110.

In addition, in step S30, as illustrated in FIGS. 9A and 9B, the rim of the lens 110 is attached to the adhesive application surface 122 of the lens frame 120 to fix the lens 110 so that one end of the support piece 140 is embedded, and the support piece 140 is attached to be positioned between the concave grooves 112 of the lens frame 120.

At this time, when it is difficult to adjust the position of the support piece 140 and the concave groove 112 of the lens, a method may be adopted, in which the lens 110 is first partially attached to the lens frame 120 and then one end of the support piece 140 is interposed between the lens 110 and the concave groove 112 of the lens frame 120 to fit the position, and then the lens 110 is fixed to the lens frame 120.

Subsequently, in step S40, as illustrated in FIG. 10A, the release paper 123 attached to the other end of the support piece 140 is peeled off, and as illustrated in FIGS. 10B and 10C, the glasses temples 130 are folded at an angle perpendicular to the lens frame 120 to form a shape of the glasses and then the other end of the support piece 140 applied with the adhesive is attached and fixed to the inner surface of the glasses temples 130.

In addition, in step S10, preparing a nose support fitted to the bridge of the lens frame may be further included.

The nose support 150 may include a nose support pad 151 made of a soft resin or a silicone material that is seated on the bridge of the nose of the wearer and an engaging portion 152 having an engaging groove 153 correspondingly to the bridge 121 so as to fit the nose support pad 151 to the bridge 121. In addition, the engaging portion 152 may be formed of a synthetic resin material having predetermined elasticity to be tightly fitted to the bridge 121 or have a tension piece (not illustrated) restricting the bridge 121 in the engaging groove 153 with tensioning.

In addition, after step S40, as illustrated in FIGS. 11A and 11B, the engaging portion 152 of the nose support is fitted to the bridge 121 of the lens frame 120 to engage the nose support 150. In this case, since the engaging portion 152 of the nose support is tightly fitted by using the tension of the synthetic resin material or engaged using the tension of the tension piece provided between the engaging grooves 153, the nose support is not easily removed even in motion.

In step S10, the method may further include preparing a reinforcing member 160 which is installed on one side of the glasses temples 130 to variously change and maintain the bending angle of the installation area, and a reinforcing member 170 for covering and protecting the reinforcing piece 160.

In addition, after step S40, the method may further include attaching the reinforcing piece 160 to one longitudinal side area of the glasses temples 130 as illustrated in FIG. 12A, covering the reinforcing piece 160 and the outside of the glasses temples 130 with the reinforcing member 170 as illustrated in FIG. 12B, and fixing the reinforcing piece 160 to the glasses temples by shrinkage of the reinforcing member 170 by thermal processing.

As such, according to the present invention, it is possible to reinforce a support force of the glasses temples by providing the support piece which stably supports the glasses temples at the lens frame and the bending portion of the glasses temples.

Also, it is possible to increase the support force of the glasses temples by ensuring the support angle of the support piece through the concave groove of the lens and prevent the glasses from being easily peeled even in motion or wind by increasing the feeling of wearing of the glasses.

Further, the support piece holds the glasses temples to be maintained in a predetermined angle range to prevent the bending portion of the glasses temples from being easily modified or being broken even if the glasses are worn or removed, thereby constantly maintaining the shape of the glasses.

Further, the nose support made of silicon or a soft resin is used to give the very good feeling of wearing when the glasses are worn on the face, hold the center of the glasses, and provide comfort of the wearing of the glasses by a function of preventing the glasses from flowing down.

Further, various bending angles of the glasses temples may be adjusted by reinforcing one longitudinal side of the glasses temples by the reinforcing member and the reinforcing piece, thereby maintaining the shape of the glasses and greatly increasing the feeling of wearing of the glasses.

Although the preferred embodiments of the present invention have been described above, the present invention is not limited to the specific embodiments described above. It will be apparent to those skilled in the art that various modifications and variations can be made in the present invention without departing from the spirit and scope of the appended claims, and all of these appropriate modifications and variations as equivalents should be considered to be within the scope of the present invention.

INDUSTRIAL AVAILABILITY

The present invention may be widely used in various kinds of paper glasses.

The invention claimed is:
1. Paper glasses comprising:
a lens frame connected in parallel to both sides of a central bridge to fix a lens;
glasses temples which are extended integrally from both sides of the lens frame and bent at an angle perpendicular to the lens frame to wear the lens frame on the face; and a support piece of which one end is fixed to the lens frame and the other end is fixed to the front end of the glasses temples to ensure a support force of the glasses temples and maintain a predetermined angle of the glasses temples, wherein concave grooves are formed at both sides of the lens so that one end of the support piece is inserted into a position corresponding to one end of the support piece and the support piece is inserted into the concave groove to ensure a support angle capable of stably supporting the glasses temples.

2. The paper glasses of claim 1, wherein the support angle of the support piece is adjusted according to a depth of the support piece inserted into the concave groove.

3. The paper glasses of claim 1, wherein one surface of the lens frame is applied with an adhesive and the lens is attached onto the adhesive application surface.

4. The paper glasses of claim 3, wherein one end of the support piece is interposed and fixed between the adhesive application surface of the lens frame and the lens attached to the adhesive application surface and the other end thereof is attached to a front end of the glasses temples with an adhesive applied to the back surface.

5. The paper glasses of claim 4, wherein the other end or both ends of the support piece includes an adhesive portion having a larger area than the support piece so that a large area is in surface contact to increase an adhesive force.

6. The paper glasses of claim 1, wherein a bridge of the lens frame is fitted with a nose support which increases a slip prevention function and the feeling of wearing of the glasses, and the nose support includes a nose support pad made of a soft resin or a silicon material which is seated on the bridge of the nose of the wearer and an engaging groove having an engaging groove correspondingly to the bridge so as to fit the nose support pad to the bridge.

7. The paper glasses of claim 6, wherein the engaging portion is formed of a synthetic resin material having predetermined elasticity to be tightly fitted to the bridge or has a tension piece restricting the bridge in the engaging groove with tensioning.

8. The paper glasses of claim 1, wherein a reinforcing piece which is installed at one longitudinal side of the glasses temples to variously change and maintain a bending angle of the installation area is provided in the glasses temples.

9. The paper glasses of claim 8, wherein the reinforcing piece is installed in a form to be attached to one surface of the glasses temples or installed in a form to be embedded in the inside of the glasses temples.

10. The paper glasses of claim 8, wherein a reinforcing member covering and protecting the reinforcing piece is provided in the glasses temples.

11. The paper glasses of claim 10, wherein the reinforcing member is formed of a material to be shrunk upon heating and fixed to the glasses temples through shrinkage by thermal processing in the form of covering the reinforcing piece of the glasses temples.

12. A method for manufacturing paper glasses comprising:

preparing a glasses rim provided to integrally connect the lens frame and the glasses temples, apply the adhesive on one surface of the lens frame, and attach the release paper onto the adhesive application surface, a support piece provided to have a predetermined length capable of supporting the glasses temples, apply the adhesive onto the back surface of the other end, and attach a release paper onto the adhesive application surface, and a lens to be engaged to the lens frame (step S10);

peeling off the release paper attached onto the lens frame and attaching and fixing one end of the support piece onto the adhesive application surface on a central line of the glasses temples (step S20);

attaching and fixing a rim of the lens onto the adhesive application surface of the lens frame so that one end of the support piece is embedded (step S30); and peeling off the release paper attached to the other end of the support piece, folding the glasses temples at an angle perpendicular to the lens frame to form a shape of the glasses, and then attaching and fixing the other end of the support piece applied with an adhesive onto the inner surface of the glasses temples (step S40).

13. The method for manufacturing paper glasses of claim 12, wherein in step S10, concave grooves into which one end of the support piece is inserted are formed at both sides of the lens.

14. The method for manufacturing paper glasses of claim 13, wherein in step S30, the lens is attached onto the adhesive application surface of the lens frame to embed one end of the support piece and the support piece is inserted and attached between the concave grooves.

15. The method for manufacturing paper glasses of claim 14, wherein in step S40, one side of the support piece inserted into the concave groove of the lens and the other side of the support piece attached to the glasses temples are inclined diagonally to secure a support angle for stably supporting the glasses temples.

16. The method for manufacturing paper glasses of claim 12, wherein in step S10, the support piece includes an adhesive portion having a larger area than the support piece so as to increase the adhesive force because an area being in surface contact with the other end or both ends is increased.

17. The method for manufacturing paper glasses of claim 12, further comprising:

preparing a nose support to be fitted to the bridge of the lens frame in step S10, and fitting the engaging portion of the nose support to the bridge of the lens frame after step S40.

18. The method for manufacturing paper glasses of claim 17, wherein the engaging portion of the nose support is formed of a synthetic resin material having predetermined elasticity to be tightly fitted to the bridge or has a tension piece restricting the bridge in the engaging groove with tensioning.

19. The method for manufacturing paper glasses of claim 12, further comprising:

preparing a reinforcing piece which is installed at one side of the glasses temples to variously change and maintain a bending angle of the installation area and a reinforcing member covering and protecting the reinforcing piece in step S10, and attaching the reinforcing piece to one longitudinal side area of the glasses temples, covering the reinforcing piece and the outside of the glasses temples with the reinforcing member, and fixing the reinforcing piece to the glasses temples by shrinkage of the reinforcing member by thermal processing, after step S40.

* * * * *